(12) United States Patent
Li et al.

(10) Patent No.: US 6,563,718 B1
(45) Date of Patent: May 13, 2003

(54) CAPACITIVELY COUPLED POWER CONVERTER

(75) Inventors: Qiong Michelle Li, Cortlandt Manor, NY (US); Nai-Chi Lee, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/012,017

(22) Filed: Dec. 6, 2001

(51) Int. Cl.[7] .................. H02M 3/335; H02M 1/12
(52) U.S. Cl. .................. 363/16; 363/49; 363/21.13
(58) Field of Search .................. 363/16, 17, 20, 363/21.13, 21.17, 56, 49, 41, 97, 95; 323/901, 907

(56) References Cited

U.S. PATENT DOCUMENTS

| | | | | | |
|---|---|---|---|---|---|
| 3,771,040 | A | * | 11/1973 | Flectcher et al. | 363/21.13 |
| 5,140,513 | A | * | 8/1992 | Yokoyama | 363/56 |
| 5,436,820 | A | * | 7/1995 | Furmanczyk | 363/49 |
| 5,499,184 | A | * | 3/1996 | Squibb | 363/100 |

* cited by examiner

*Primary Examiner*—Rajnikant B. Patel
(74) *Attorney, Agent, or Firm*—Edward W. Goodman

(57) ABSTRACT

A power converter apparatus employing a capacitively coupled feedback network for facilitating bi-directional communication between a primary and secondary side of the converter while maintaining direct current isolation.

26 Claims, 9 Drawing Sheets

CAPACITIVELY COUPLED POWER CONVERTER

BACKGROUND OF THE INVENTION

1. Field of the Invention

The present invention is directed, in general, to power conversion and, more specifically, to a power converter having a capacitively coupled feedback circuit for minimizing circuit costs and providing bi-directional communication in the power converter.

2. Description of the Related Art

A power converter is a power processing circuit that converts an input voltage or current waveform into a specified output voltage or current waveform. A switched-mode power converter is a frequently employed power converter that converts an input voltage into a specified output voltage. Power converters generally include power transfer components (e.g., transformers and switches) and control circuitry which governs the operation of the power transfer components to achieve desired operating characteristics.

It is often important (e.g., for safety reasons) that the primary and secondary sides of the converter be isolated from one another. Safety regulations (such as ULTM. requirements in the United States) often require some isolation between the power supply mains and electronic equipment. As a result, the transfer of control information from the secondary to primary sides is usually done via an isolation device (e.g., a transformer in which two windings are coupled by a permeable core, an opto-coupler, or a discrete light emitting device located adjacent to a discrete light detecting device) which is included in the control circuitry.

FIG. 1 is an illustration of a prior art power converter 100 which illustrates one technique for providing feedback from secondary to primary by using a second (small-signal) transformer T2. The voltage $V_{in}$ on the primary side can be either an AC or DC voltage. The feedback control signal can be either amplitude-modulated (as in the case of the Unitrode UC3901) or pulse-triggered (as in the case of Intersil ICL7675/7676). In the latter arrangement, compensation could be implemented entirely on the secondary side, with only the final PWM signal being sent to the primary side.

FIG. 2 is an illustration of a prior art power converter 200 which utilizes an opto-coupler 202 for providing DC isolation for the control loop. Opto-couplers are typically used where safety regulations require galvanic isolation between the AC line voltage and the outputs of a switch-mode power supply. In the circuit of FIG. 2, the power transformer T1 is used to transfer the desired energy from the primary side to the secondary side, while maintaining DC isolation. The optical coupler 202 is used to feed the output signal back to the primary side. The voltage $V_{in}$ on the primary side can be either an AC or DC voltage. The reference voltage $V_{ref}$ and a compensator 204 (or filter) is implemented on the secondary side. Additional compensation is usually necessary on the primary side. The use of opto-couplers is applicable to many power converter topologies, such as forward converter, flyback converter, etc.

One disadvantage associated with transformer isolation, as shown in FIG. 1, is that the isolation transformer, T2, is optimally designed to transfer high frequency signals (e.g., gate signals), and is ill-suited to transfer direct current (DC) signals whose characteristic frequencies can be highly variable. Another disadvantage associated with transformer isolation is that the transformer is susceptible to saturation. To prevent this occurrence, reset circuitry is often required.

Optical coupler isolation, as shown in FIG. 2 introduces its own unique set of disadvantages, such as low bandwidth (due to its limited frequency response), non-linearity and poor temperature stability and unidirectional communication capability. Accordingly, additional compensation circuits are needed on the secondary side.

A further disadvantage associated with both prior art approaches for providing feedback is that both methods require relatively expensive isolation devices (e.g., transformers, opto-couplers).

A still further disadvantage associated with the prior art approaches is that it is very difficult to design the compensator and reference voltage on the primary side. As such, the reference circuit and compensator cannot be integrated into the primary controller. This is especially true when the primary controller is implemented in a microcontroller or DSP. In this case, a filter and a reference voltage are still required on the secondary side. This limitation increases product costs and reduces flexibility.

Accordingly, there is a need in the art for a feedback approach that overcomes the afore-stated disadvantages of the prior art.

SUMMARY OF THE INVENTION

The present invention is embodied in a fly-back converter employing feedback and electrical isolation in a unique fashion using inexpensive components. While a fly-back converter is used to illustrate the teachings of the present invention, the principles of the invention may be applied to other power converter topologies. Instead of using optical or transformer coupling to provide electrical (DC) isolation as is well known in the prior art, the present invention uses a capacitive coupling network in the feedback loop.

The capacitive coupling network or circuit of the present invention has applicability to digital and analog embodiments. In an analog embodiment, the capacitive coupling network provides a more effective solution in terms of both cost and size than prior art optical and transformer coupling networks. In a digital embodiment, the capacitive coupling network provides a flexible solution than afforded by the prior art by providing a bi-directional communication capability between the primary and secondary sides of the converter for transmitting control data and commands therebetween. Further, the digital embodiment advantageously removes the need for either the primary or secondary side micro-controller as used in the prior art. A still further advantage is that the digital information is transferred bi-directionally substantially without corruption therefore there is no linearity or temperature sensitivity problems. It is further noted that both the analog and digital implementations maintain DC isolation.

Other objects and advantages of the invention will become apparent from the following description of the presently preferred embodiments of the invention taken in conjunction with the drawings.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiments but are for explanation and understanding only.

DETAILED DESCRIPTION OF THE PREFERRED EMBODIMENTS

The numerous innovative teachings of the present application will be described with particular reference to the presently preferred embodiment (by way of example, and not of limitation), in which:

Digital Implementation

FIGS. 3a–c and FIG. 4 illustrate a digital implementation of the capacitively coupled feedback network or circuit. It is contemplated that said circuit could be utilized as a standalone circuit or network, or instead be incorporated or integral with either a primary side or a secondary side module. For example, the circuit could be integral with any of the primary side 302 elements of FIG. 3a, or with any of the secondary side 304 elements of FIG. 3a.

Figure 1:
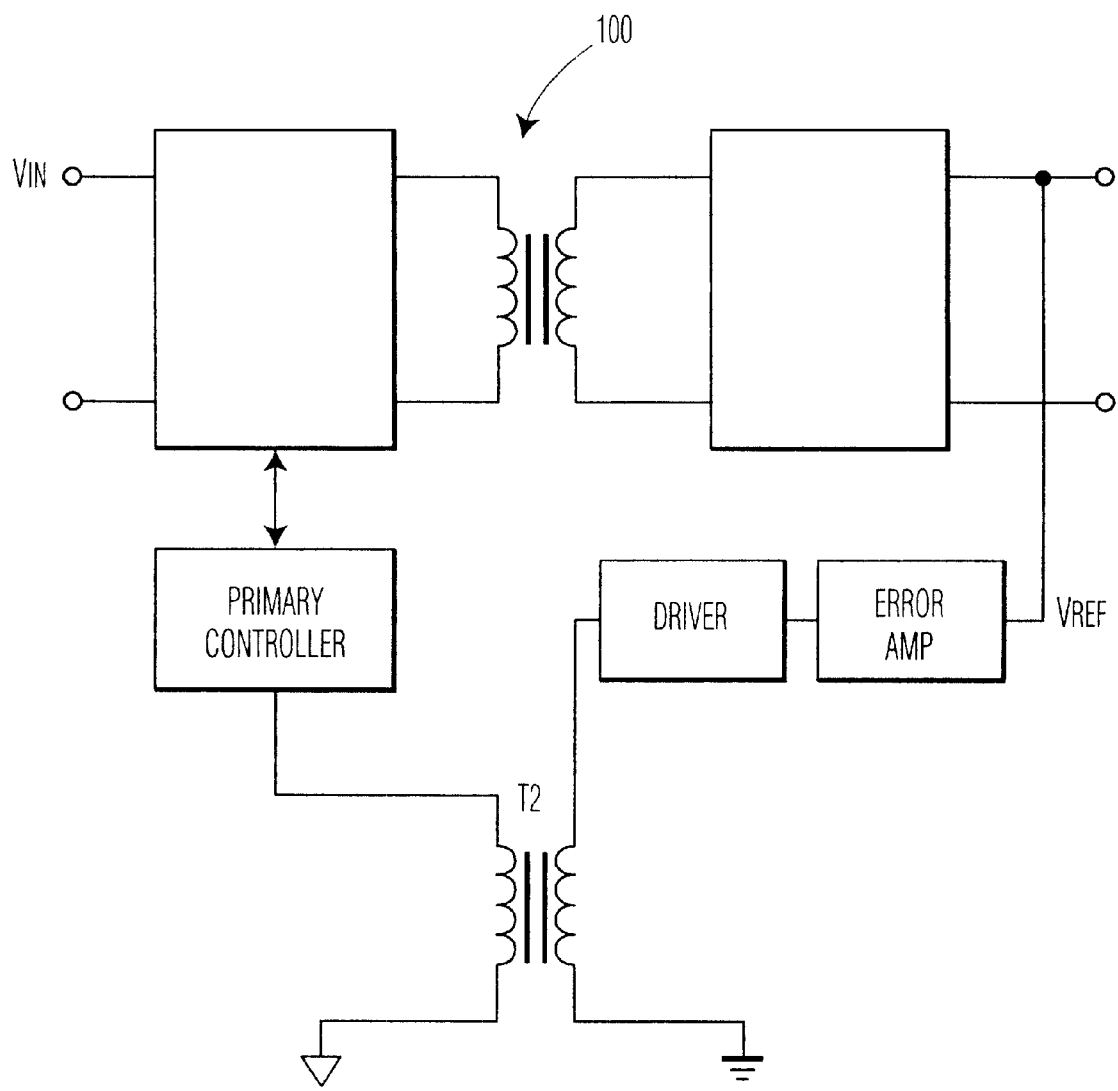
FIG. 1 is a is a schematic diagram of a representative prior art isolated power converter which uses transformer coupling to isolate the power converter input from its output.
Figure 2:
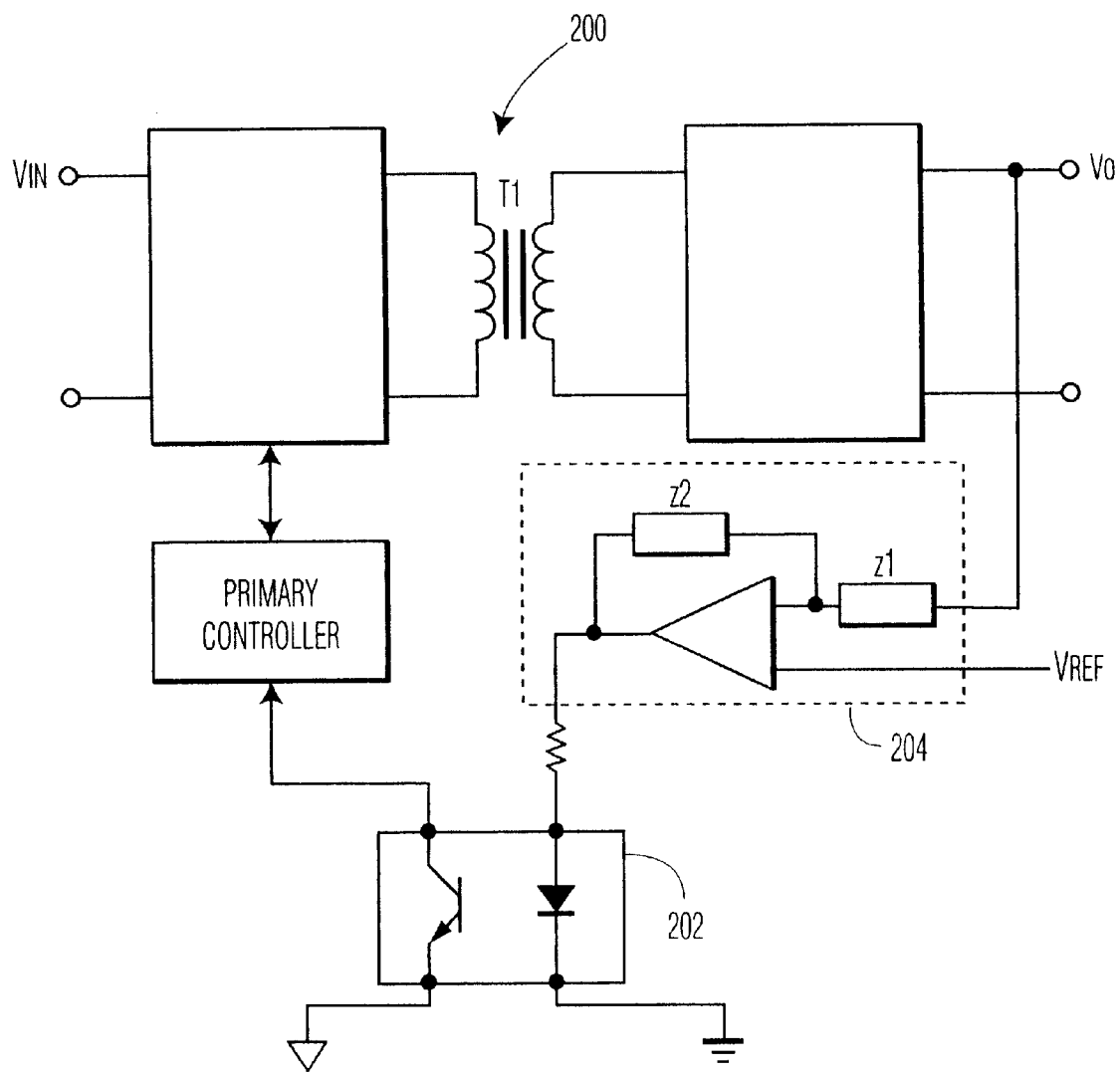
FIG. 2 is a is a schematic diagram of a representative prior art isolated power converter which uses optical coupling to isolate the power converter input from its output.
Figure 3A:
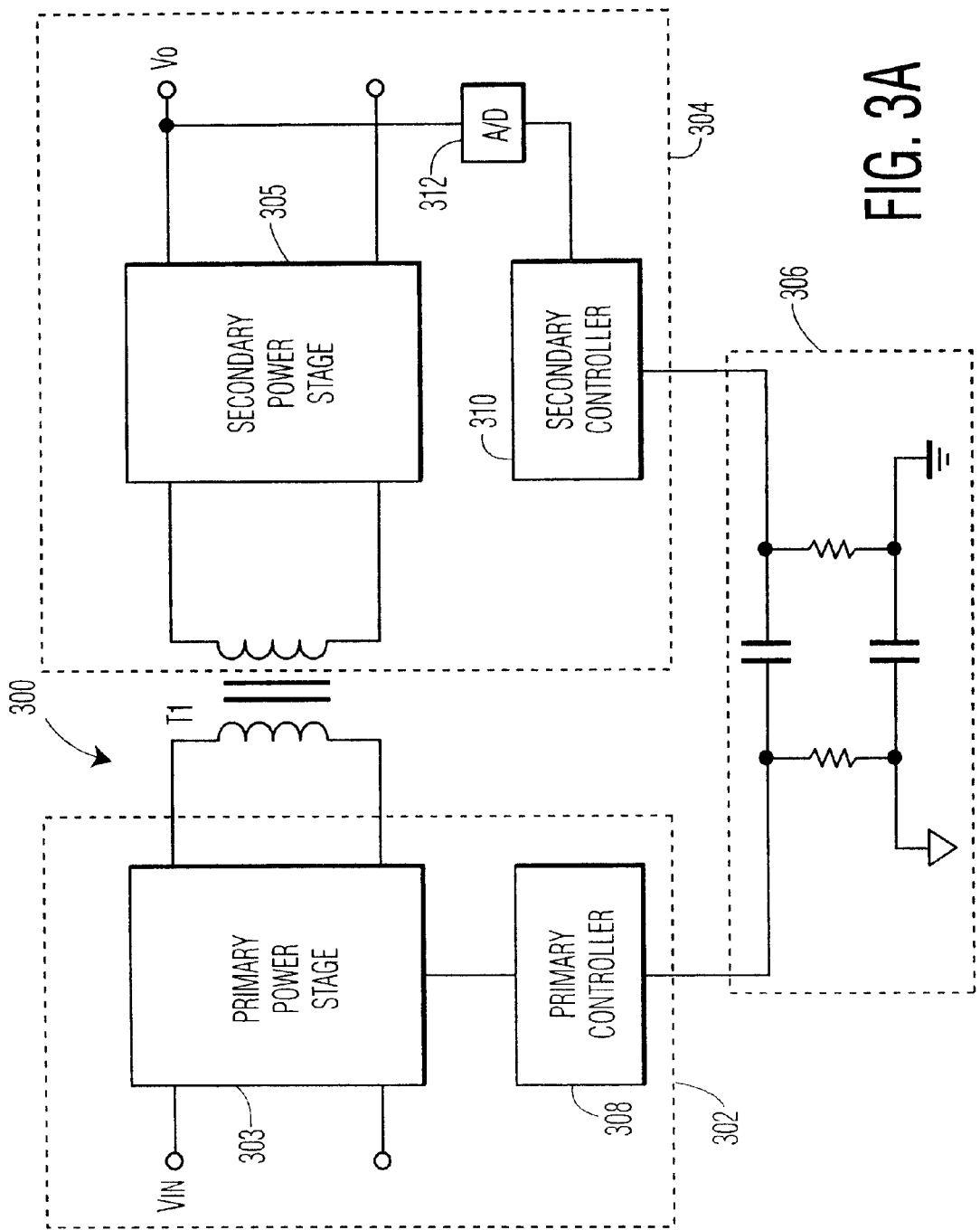
FIG. 3a is a functional illustration of a digital embodiment of an isolated power converter constructed in accordance with the principles of the present invention.
Figure 3B:
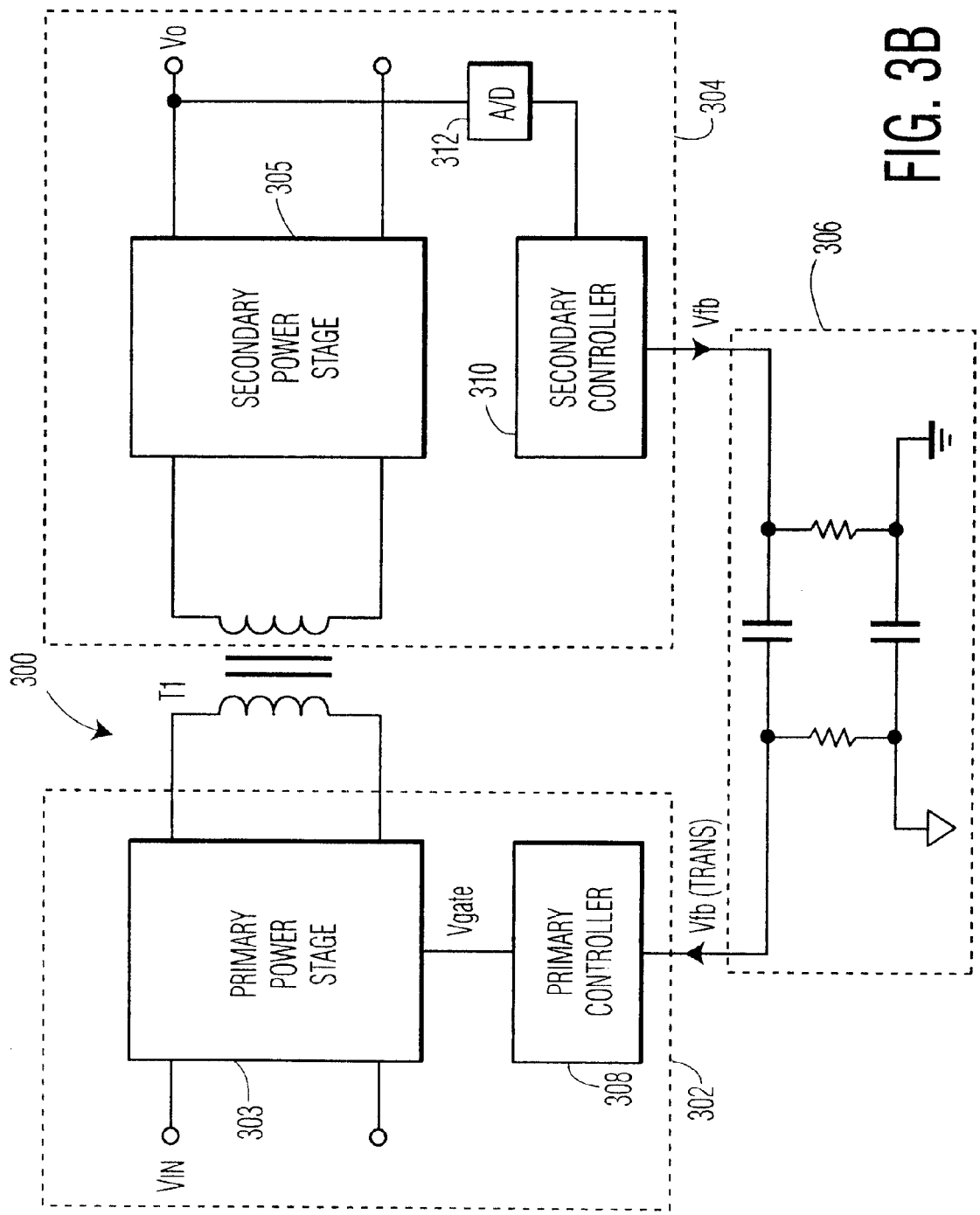
FIG. 3b is an illustration of the circuit of FIG. 3a showing the signals for performing primary side compensation.
Figure 3C:
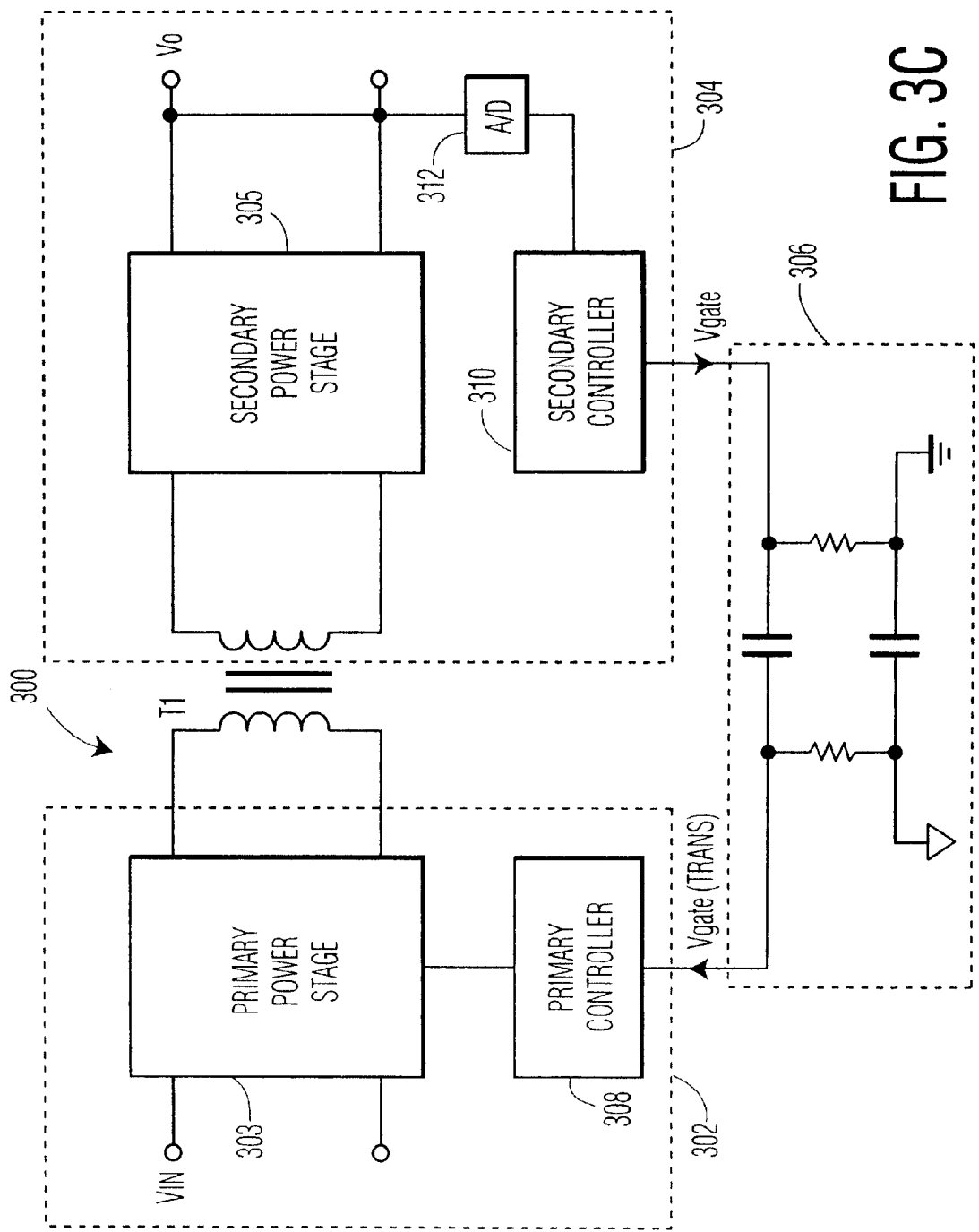
FIG. 3c is an illustration of the circuit of FIG. 3a showing the signals for performing secondary side compensation.
Figure 4:
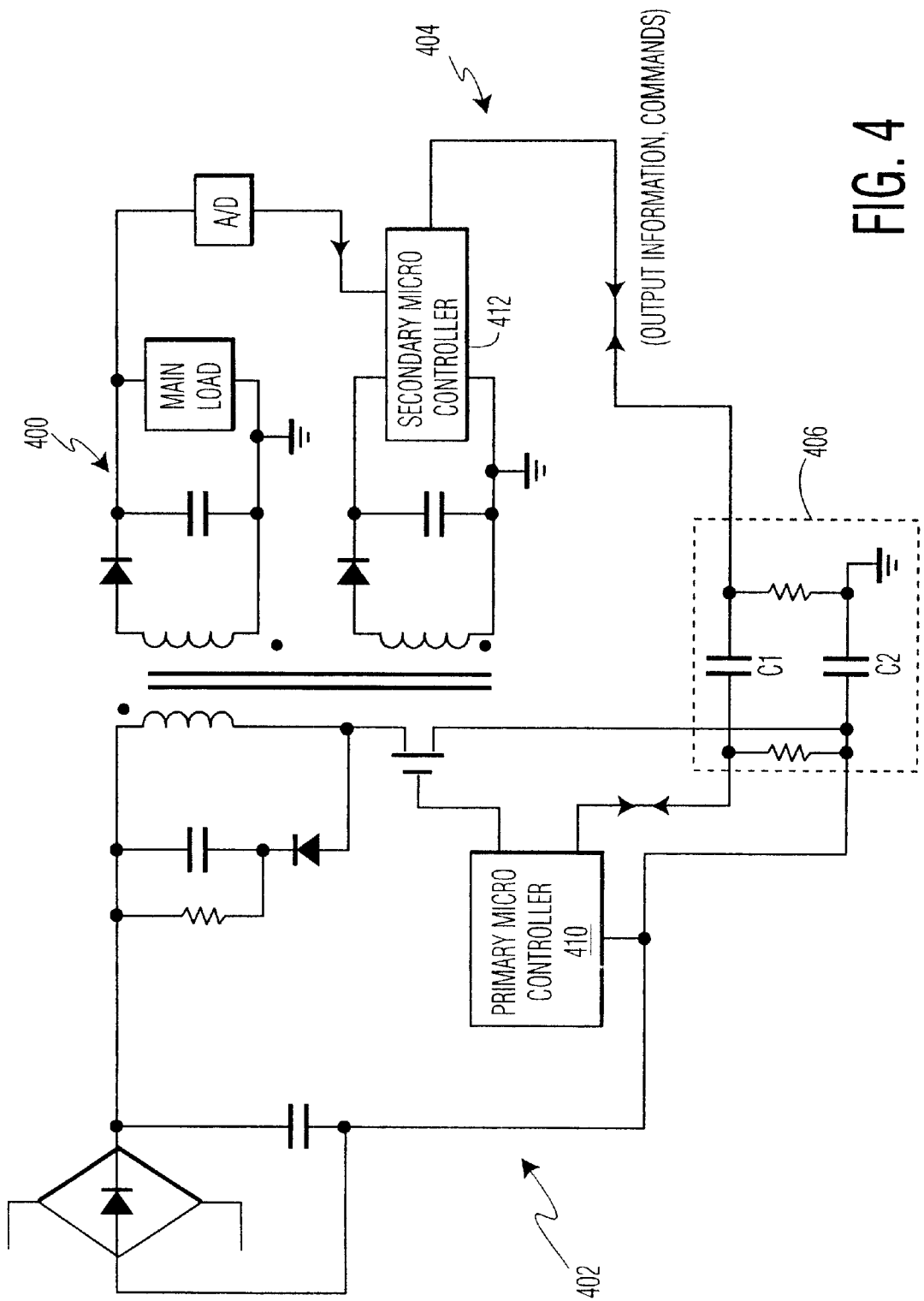
FIG. 4 is an illustration of a digital embodiment of a multiple-output flyback converter for performing bi-directional communication in accordance with the present invention.

FIGS. 3a–c illustrate techniques for effecting primary side and secondary side compensation and FIG. 4 illustrates the bi-directional transmission capability of the capacitively coupled network for transmitting digital data (i.e., command and control information).

FIGS. 3a–c illustrate techniques for effecting primary side and secondary side compensation for the digital implementation of the inventive capacitive coupling network.

FIG. 3a is a functional illustration of a digital implementation of a general power converter configuration 300 including the inventive capacitive coupling feedback circuit 306 of the present invention. FIGS. 3b and 3c illustrate those signals involved in the power converter configuration of FIG. 3a for performing primary side and secondary side output regulation, respectively.

Referring now to FIG. 3a, the isolated power converter 300 includes a primary side 302. The primary side 302 further includes a primary power stage 303 and a primary side controller 308. The power converter 300 also includes a transformer T1, and a secondary side 304 which further includes a secondary power stage 305, an A/D converter 312 and a secondary controller 310. The elements recited above are conventional and well known in the art. In addition to the aforementioned elements, the converter 300 further includes an inventive feedback circuit 306. The feedback circuit 306 is embodied as a capacitive coupler for coupling the secondary 304 and primary 302 sides while maintaining electrical (i.e., DC) isolation. The inventive capacitive coupling feedback circuit 306 permits feedback compensation to be implemented on either the primary side 302 or the secondary side 304. Both primary and secondary side feedback compensation approaches are discussed below with reference to FIGS. 3b and 3c.

Primary Side Compensation for the Digital Embodiment

As discussed in the background, it is very difficult to implement primary side compensation using conventional feedback structures (e.g., transformer, optical-coupling). The present invention achieves primary side compensation by employing the inventive capacitive coupling feedback circuit 306 of the present invention.

FIG. 3b is an illustration of the circuit of FIG. 3a showing the signals for performing primary side compensation. In the circuit of FIG. 3b, a feedback signal $V_{fb}$ generated as an output signal from the secondary side controller 310 is transferred via the inventive capacitive coupling feedback circuit 306 to the primary side controller 308 for regulating the output voltage $V_o$. It is noted that primary side compensation can be achieved with or without the secondary side controller 310 which is an incidental component for performing primary side compensation. As shown, the feedback (voltage regulation) signal $V_{fb}$ is transferred from the secondary side 304 to the primary controller 308 on the primary side 302. The primary controller 308 uses the transferred signal $V_{fb(trans)}$ as input to generate a gate signal $V_{gate}$ to be supplied to the primary power stage 303 for controlling a switching element therein.

The capacitive coupling feedback circuit 306 of the present invention, capacitively couples or transfers the feedback signal $V_{fb}$ to the primary side 302 while maintaining direct current isolation between the primary 302 and secondary 304 side of the transformer T1. Further, as a consequence of utilizing the inventive coupling network 300, there is no concern for linearity or temperature sensitivity variations associated with opto-couplers or saturation concerns associated with transformer coupling.

Secondary Side Compensation for the Digital Embodiment

FIG. 3c is an illustration of the circuit of FIG. 3a including those required signals for performing secondary side compensation. In the circuit of FIG. 3c, a final gate signal $V_{gate}$ is generated on the secondary side 304, and is transferred, via the inventive capacitive coupling network 306, to be received as a transferred gate signal $V_{gate(trans)}$ on the primary side 302 as an input to the primary controller 308 for regulating the output voltage $V_o$. It is noted that secondary side compensation can be achieved with or without the primary side controller 308 which is an incidental component for performing secondary side compensation.

It is therefore shown that the capacitive coupling feedback circuit 306 of the present invention, couples or transfers the gate signal $V_{gate}$ to the primary side 302 while maintaining direct current isolation between the primary 302 and secondary 304 side of the transformer T1. Further, as a consequence of utilizing the inventive coupling network, there is no concern for linearity or temperature sensitivity variations.

In addition to performing primary and secondary side compensation, the inventive capacitive coupling feedback circuit 306 provides a further capability of bi-directional communication between the primary 302 and secondary 304 side of the transformer T1. This capability is illustrated with reference to FIG. 4.

Bi-directional Communication for the Digital Embodiment

FIG. 4 illustrates, by example, an exemplary power converter configuration 400 to illustrate the bi-directional communication capability of the inventive capacitive coupling feedback circuit 306 of the present invention. In particular, FIG. 4 illustrates a multiple-output flyback converter 400 generally including primary 402 and secondary 404 sides and further includes the inventive capacitive coupling network 406.

In operation, bi-directional digital data (e.g., output information and/or commands) are passed, via the inventive capacitive coupling network 406, between the primary 402 and secondary 404 sides of the converter 400. One example of primary to secondary communication occurs when the primary must inform the secondary of a drop in the line voltage such that the secondary side can shut down safely. An example of secondary 404 to primary 402 communication is the ability of the secondary 404 to inform the primary 402 of a desire to change modes (e.g., go to an energy saving mode).

As shown in the circuit of FIG. 4, primary-side 410 and secondary-side 412 micro-controllers are included to carry out the generation, issuance and receipt of the commands.

Analog Implementation

Figure 5:
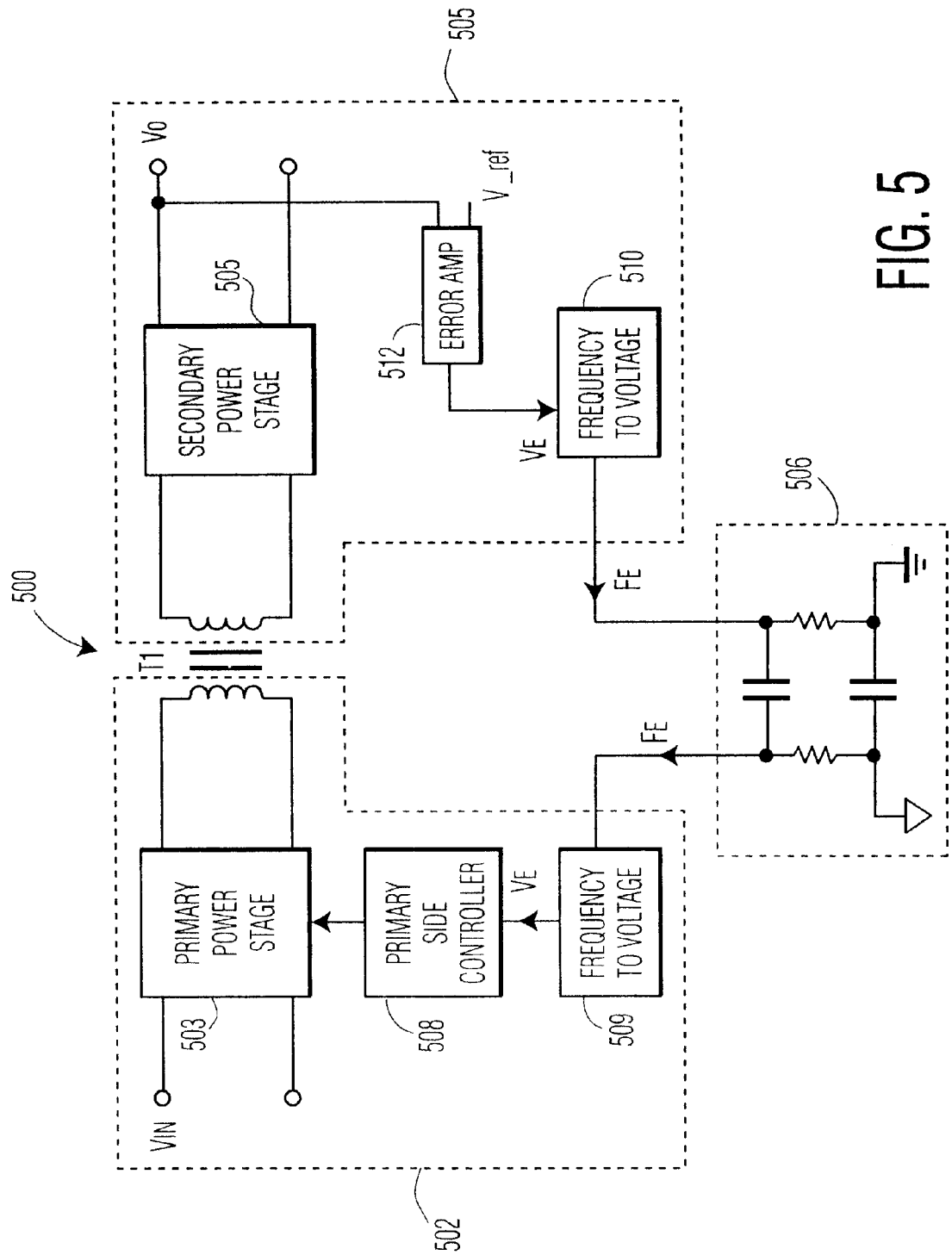
FIG. 5 is an illustration of an analog embodiment of a capacitive coupler in accordance with the present invention.

FIG. 5 is a functional illustration of an analog embodiment of an isolated power converter 500 constructed in accordance with the principles of the present invention. The isolated power converter 500 includes a primary side 502. The primary side 502 further includes a primary power stage 503, a primary side controller 508, and a frequency-to-voltage converter 509. The power converter 500 also includes a transformer T1, and a secondary side 504 which further includes a secondary power stage 505, an error amplifier 512 and a voltage-to-frequency converter 510. The elements recited above are conventional and well known in the art. In addition to the aforementioned elements, the converter 500 further includes the inventive capacitively coupled feedback circuit 506, which is identical in function and structure to the capacitively coupled feedback circuit 506 illustrated in FIGS. 3a–c.

In the current analog embodiment, the feedback circuit 506 facilitates feedback control between the primary 502 and secondary 504 sides of the converter 500. The circuit 500 generally operates by converting an error voltage to a frequency for transmission over the capacitive coupling network from the secondary to the primary side as an analog signal. Once received on the primary side, the analog frequency signal is converted back to its original corresponding voltage to control the duty cycle of a primary side power switch.

The following is a more detailed explanation of the analog embodiment of the circuit 500 of FIG. 5. An error amplifier 512 compares the output voltage Vo, with a reference voltage $V_{REF}$, to produce an error voltage, $V_E$, to be supplied as input to the voltage-to-frequency converter 510. The voltage-to-frequency converter 510 converts the supplied error voltage $V_E$ to a corresponding frequency $F_E$ to be transmitted across the capacitively coupled feedback circuit 506. Voltage to frequency conversion techniques are well known in the art.

DC isolation is maintained by converting the error voltage $V_E$ to a corresponding analog frequency $F_E$ waveform which is suitable for transmission over the capacitively coupled network 506. The transmitted frequency $F_E$ is then received on the primary side 502 by a frequency-to-voltage converter 509 to convert the transmitted frequency $F_E$ back to the original error voltage $V_E$. The converted error voltage $V_E$ is supplied as input to the primary-side controller 508 to adjust the duty cycle of a power switch, which is an element of the primary power stage 503.

Illustrative Embodiment

Figure 6:
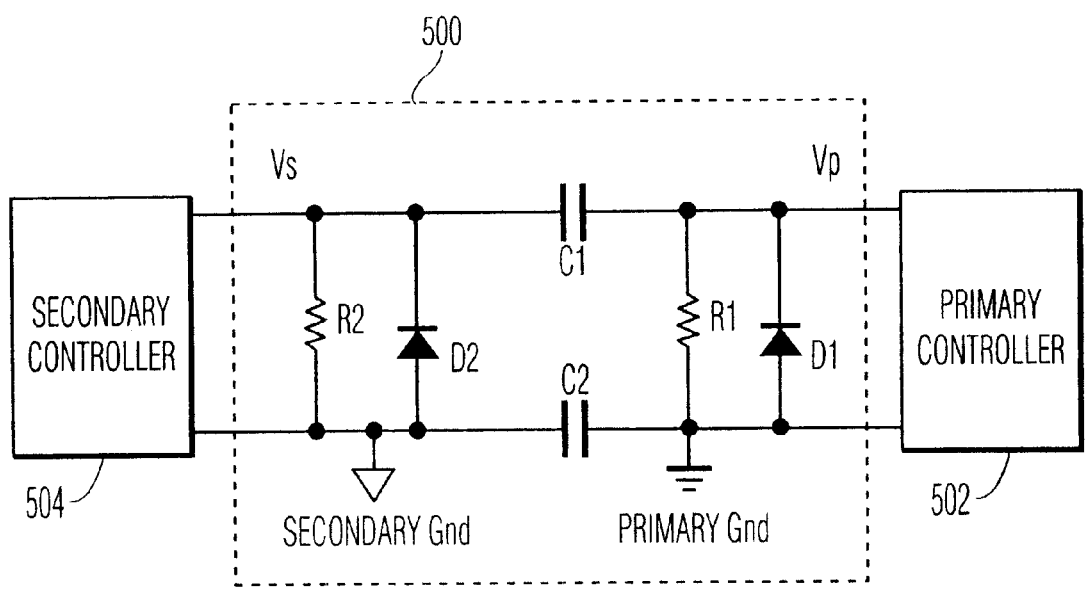
FIG. 6 is an illustration of a preferred configuration of a capacitive coupler 600 in accordance with the present invention.

FIG. 6 is an illustration of a preferred configuration of a capacitive coupler 600 in accordance with the present invention. Elements 602 and 604 are identical to those shown in FIG. 3, i.e., 302, 304, FIG. 4, i.e., 402, 404, FIG. 5, i.e., 502, 504 and FIG. 6, i.e., 602, 604 and have the same functionality as previously described. As shown, capacitors C1 and C2 permit bi-directional communication between a primary and secondary side of the converter while maintaining DC isolation. Diodes D1 and D2 are included to compensate for some expected DC bias drift due to a change in the DC bias during a changing pulse pattern. The diodes D1 and D2 serve to prevent the DC bias drift resulting from the pulse changes by removing the DC bias altogether (i.e., shunting the DC bias to ground). Other compensation methods are well within the scope of the present invention and may include, for example, using a logic buffer or voltage comparator. Resistors R1 and R2 provide a load to the secondary and primary side controllers, respectively.

Simulation Results

This section describes the performance of the capacitive coupler 600 in sending serial (binary) data from the secondary controller 504 to the primary controller 602 of FIG. 6.

Figure 7A:
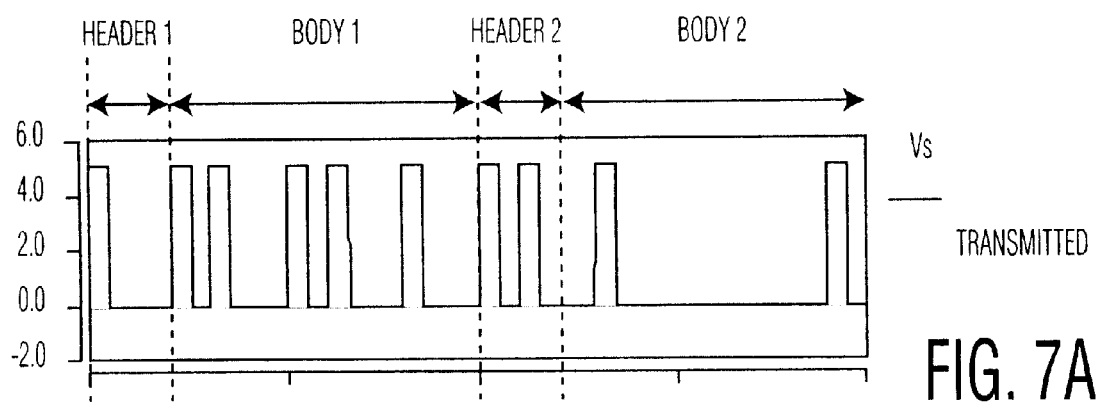
FIG. 7 is a timing diagram of a simulation result illustrating the transmission of serial data from the secondary to the primary side through the capacitive coupler shown by FIG. 5.
Figure 7B:
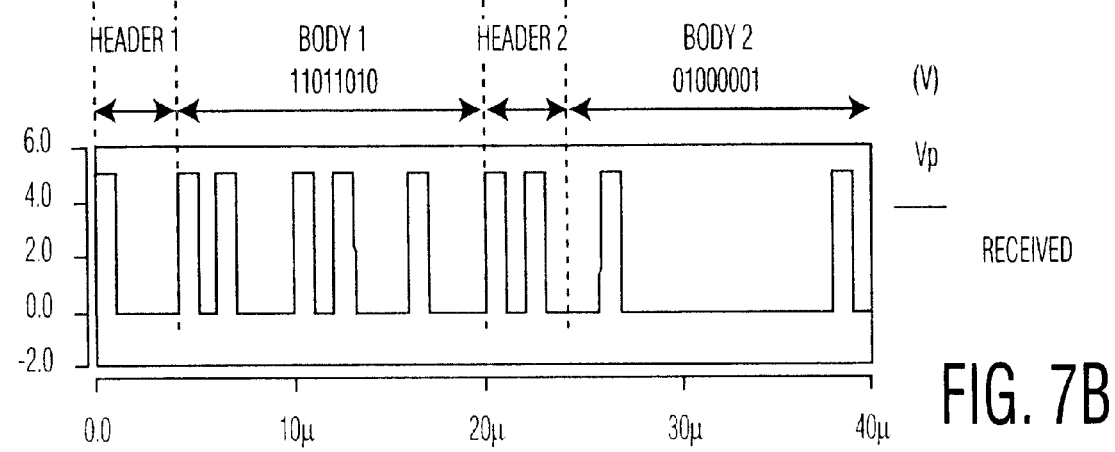

Referring now to FIGS. 7a and 7b, which illustrate the simulation result of sending serial data from the secondary side to the primary side of the controller of FIG. 3c. As shown, the serial data is sent in two sections, a first section defined herein as the 'header' section which is a data identification section describing the type of data will follow in the corresponding 'body' section which can include, for example, binary encoded voltage values.

FIG. 7a illustrates the transmission of a first header section, header 1, from the secondary side, followed by a corresponding body section, body 1, followed by the transmission of a second header section, header 2, followed by its corresponding body section, body 2. The header section may, for example, consist of a single bit for a simple feedback control implementation, or multiple bits for extra two-way or one-way communication in another implementation. In the simulation result of FIG. 7, two bits are shown which could represent, for example, feedback transfer data, e.g., bit sequence "1,0", or commands to be transferred from the secondary to the primary, e.g., bit sequence "0,1", or commands to be transferred from primary to secondary, e.g., bit sequence "1,1". As shown in FIG. 7, the data is transferred from primary to secondary through the inventive capacitive coupler without corruption.

While the invention has been described with respect to specific embodiments by way of illustration, many modifications and changes will be apparent to those skilled in the art. It is therefore, to be understood that the appended claims are intended to cover all such modifications and changes as fall within the true spirit and scope of the invention.

What is claimed is:

1. A power converter comprising:
   a primary side having a primary power stage;
   a secondary side having a secondary power stage; and
   means for capacitively coupling said primary side and secondary side while maintaining direct current isolation between said primary and secondary sides.

2. The power converter as claimed in claim 1, wherein said means for coupling includes at least a first capacitor and a second capacitor for coupling said primary and secondary sides.

3. The power converter as claimed in claim 2, wherein said primary side further comprises a primary controller, and said secondary side further comprises a secondary controller, and wherein said means for coupling further includes a first diode, a second diode, a first resistor and a second resistor, said first diode and said first resistor being coupled in parallel across a first terminal of said first and second capacitors and across said primary controller, and said second diode and said second resistor being coupled in parallel across a second terminal of said first and second capacitors and across said secondary controller.

4. The power converter as claimed in claim 3, wherein said first and second diodes substantially eliminate a direct current drift associated with said control information and command information passed between said primary and secondary sides.

5. The power converter as claimed in claim 3, wherein said first resistor and said first diode form a first circuit at a primary ground potential, and wherein said second resistor and said second diode form a second circuit at a secondary ground potential.

6. A power converter comprising:
   a primary side comprising:
      a primary power stage; and
      primary side means for sending and/or receiving control information and commands used in controlling operation of the power converter;
   a secondary side comprising:
      a secondary power stage; and
      secondary side means for receiving and/or sending said control information and commands used in controlling operation of the power converter; and
   a capacitor coupling circuit for coupling said primary side and secondary side, and for passing said control information and commands between said primary and secondary sides, said capacitor coupling circuit having means for maintaining direct current isolation between said primary and secondary sides when passing said control information and commands.

7. The power converter as claimed in claim 6, wherein said primary side means for sending and/or receiving said control information and commands is a primary controller, and wherein said secondary side means for receiving and/or sending said control information and commands is a secondary controller.

8. The power converter as claimed in claim 7, wherein said capacitor coupling circuit includes at least a first capacitor and a second capacitor for coupling said primary and secondary sides to pass said control information and commands between said primary and secondary sides.

9. The power converter as claimed in claim 8, wherein said capacitor coupling circuit further includes a first diode, a second diode, a first resistor and a second resistor, said first diode and said first resistor being coupled in parallel with a first terminal of said first and second capacitors and said primary controller, and said second diode and said second resistor being coupled in parallel with a second terminal of said first and second capacitors and said secondary controller.

10. The power converter as claimed in claim 9, wherein said first and second diodes substantially eliminate a direct current drift associated with said control information and commands.

11. The power converter as claimed in claim 9, wherein said first resistor and said first diode form a first circuit at a primary ground potential, and wherein said second resistor and said second diode form a second circuit at a secondary ground potential.

12. The power converter as claimed in claim 9, wherein said first resistor is a high impedance load to said primary controller, and said second resistor is a high impedance load to said secondary controller.

13. The power converter as claimed in claim 6, wherein said capacitor coupling circuit receives, as an output from said secondary side of said power converter, one of a gate signal and a voltage feedback signal, and provides said one of said gate signal and voltage feedback signal as an input to said primary side of said power converter while maintaining DC isolation between said primary and secondary sides.

14. The power converter as claimed in claim 6, wherein said capacitor coupling circuit receives, as an output from said primary side of said power converter, one of a gate signal and a voltage feedback signal, and provides said one of said gate signal and voltage feedback signal as an input to said secondary side of said power converter while maintaining DC isolation between said primary and secondary sides.

15. A capacitor coupling circuit for coupling a primary side and a secondary side of a converter for passing control information and commands between said primary and secondary sides, said capacitor coupling curcuit having means for maintaining direct current isolation between said primary and secondary sides when passing said control information and commands.

16. The capacitor coupling circuit as claimed in claim 15, wherein said means for maintaining direct current isolation includes at least a first capacitor and a second capacitor for coupling said primary and secondary sides to pass said control information and commands between said primary and secondary sides.

17. The capacitor coupling circuit as claimed in claim 16, wherein said means for maintaining direct current isolation further includes a first diode, a second diode, a first resistor and a second resistor, said first diode and said first resistor being coupled in parallel with a first terminal of said first and second capacitors and a primary controller of said primary side of the converter, and said second diode and said second resistor being coupled in parallel with a second terminal of said first and second capacitors and a secondary controller of said secondary side of the converter.

18. The capacitor coupling circuit as claimed in claim 17, wherein said first and second diodes substantially eliminate a direct current drift associated with said control information and commands passed between said primary and secondary sides.

19. The capacitor coupling circuit as claimed in claim 17, wherein said first resistor and said first diode form a first circuit at a primary ground potential, and wherein said second resistor and said second diode form a second circuit at a secondary ground potential.

20. The capacitor coupling circuit as claimed in claim 17, wherein said first resistor is a high impedance load to said primary controller, and said second resistor is a high impedance load to said secondary controller.

21. The capacitor coupling circuit as claimed in claim 15, wherein said capacitor coupling circuit receives a signal from said secondary side, said signal being selected from the group consisting of a gate signal and a voltage feedback signal, and provides said received signal to said primary side.

22. A power converter comprising:
   a primary side having a primary power stage and primary side means for sending and/or receiving control information and commands for controlling operation of the power converter;

a secondary side having a secondary power stage and secondary side means for receiving and/or sending said control information and commands for controlling operation of the power converter; and capacitive coupling means for coupling said primary side and said secondary side while maintaining direct current isolation between said primary and secondary sides.

23. A method for providing analog feedback in a power converter, the method comprising:

generating an error voltage on a secondary side of said power converter;

converting said error voltage to a corresponding analog error frequency;

transmitting said error frequency through a capacitively coupled feedback circuit; and converting said error frequency back to said error voltage on a primary side of said power converter.

24. The method as claimed in claim 23, wherein said method further comprises the step of using said error voltage on said primary side to control a duty cycle of a primary side power switch.

25. The method as claimed in claim 23, wherein the step of generating an error voltage on said secondary side of said power converter comprises the steps of:

comparing an output voltage from said secondary side with a voltage reference to form a difference; and computing said error voltage as the difference of said comparison step.

26. A power converter comprising:

a primary side comprising:
 a primary power stage; and
 frequency-to-voltage conversion means for converting a received analog frequency signal to a voltage error signal for controlling the operation of a primary side switch;

a secondary side comprising:
 a secondary power stage;
 means coupled to said secondary power stage for generating said voltage error signal; and
 voltage-to-frequency conversion means for converting said voltage error signal to said analog frequency signal; and a capacitor feedback circuit for transmitting said analog frequency signal on said secondary side to said prequency-to-voltage conversion means on said primary side while maintaining direct current isolation between said primary and secondary sides.

* * * * *